Figure 1:
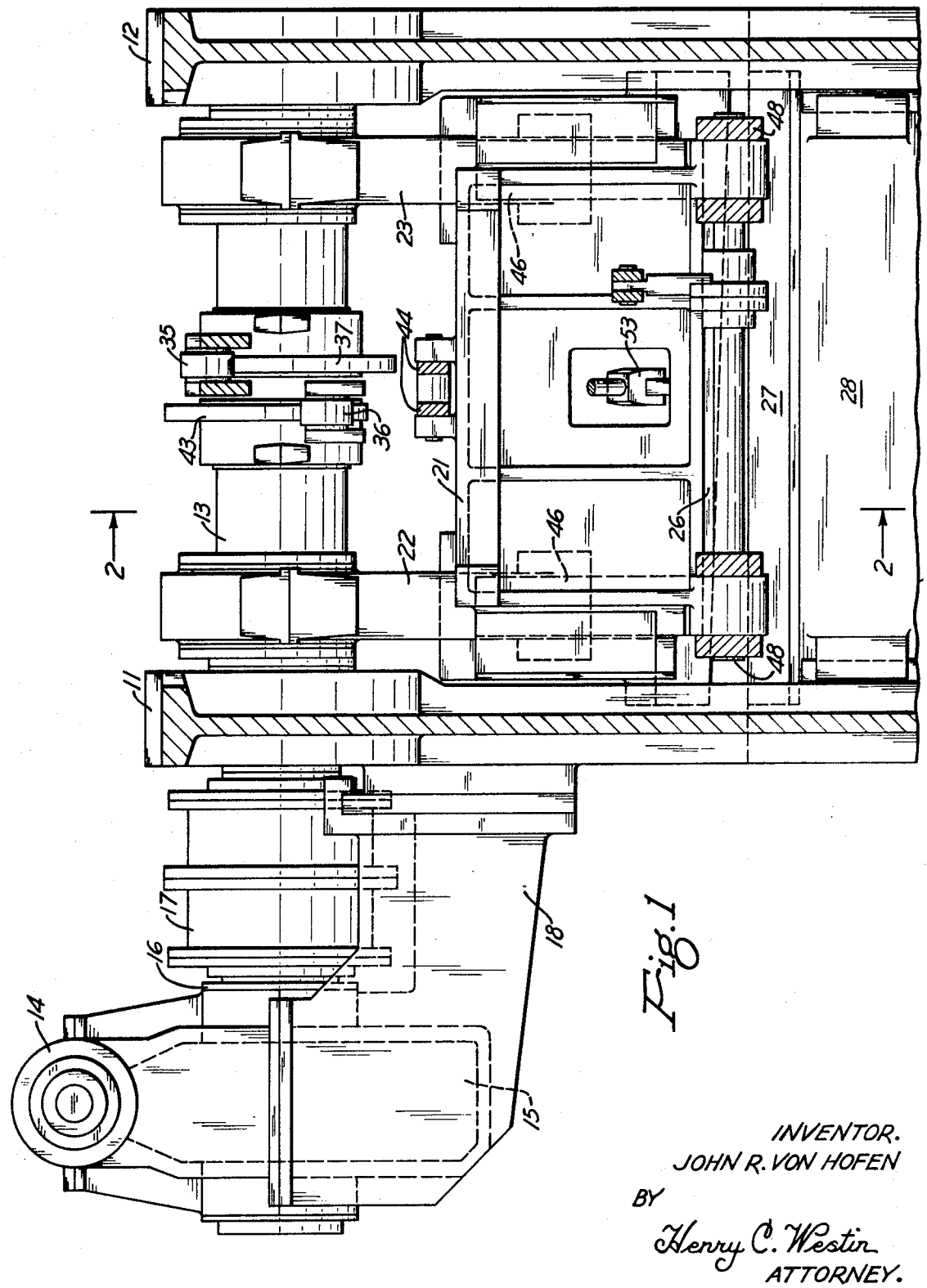

United States Patent [19]
Von Hofen

[11] 3,726,170
[45] Apr. 10, 1973

[54] SHEAR

[75] Inventor: John R. Von Hofen, Pittsburgh, Pa.

[73] Assignee: United Engineering and Foundry Company, Pittsburgh, Pa.

[22] Filed: Jan. 13, 1971

[21] Appl. No.: 106,078

[52] U.S. Cl. .......................... 83/556, 83/626, 83/632
[51] Int. Cl. ............................ B23d 31/00, B26d 5/14
[58] Field of Search ......................... 83/556, 626, 564, 83/632

[56] References Cited

UNITED STATES PATENTS

| 3,246,552 | 4/1966 | Sieger | 83/556 X |
| 3,368,440 | 2/1968 | Griese | 83/556 X |
| 3,410,167 | 11/1968 | Klein | 83/556 |

*Primary Examiner*—Frank T. Yost
*Attorney*—Henry C. Westin

[57] ABSTRACT

The disclosure of this invention relates to a shear for side trimming or dividing steel plates produced by a rolling mill. It illustrates and describes a stationary lower knife head to which there is secured a lower knife and a vertically movable upper knife head that supports the upper knife. The upper knife head is connected to a crank shaft by pitmans and through which means the upper knife is moved towards and away from the lower knife to effect a cut. The path of the shearing and return stroke of the upper knife head is controlled so that during the cutting portion of the shearing stroke, the upper knife is caused to move perpendicular to the plate over the entire range of plate thicknesses adapted to be sheared and immediately thereafter the upper knife is displaced away from the sheared edge of the plate. This control is achieved by providing a guide for the upper knife head in which the guide is held perpendicular to the plate during the shearing stroke and displaced laterally immediately after shearing and during the first portion of its return stroke in a manner that the lower portion of the head is tilted away from the sheared edge of the plate. A cam mounted on the crank shaft engaged by a cam roller connected to the guide is employed to control the positioning of the guide in timed sequence to the rotation of the crank shaft.

9 Claims, 4 Drawing Figures

INVENTOR.
JOHN R. VON HOFEN
BY
Henry C. Westin
ATTORNEY.

INVENTOR.
JOHN R. VON HOFEN
BY
Henry C. Westin
ATTORNEY.

INVENTOR.
JOHN R. VON HOFEN
BY
Henry C. Westin
ATTORNEY.

SHEAR

While the features of the present invention can be employed in many different types of shears, for the purpose of describing the preferred form of the invention, reference will be made to its application to a plate side trimming shear employed in the steel industry to trim the longitudinal marginal edges of plates after they have been rolled and cooled.

Because such plates range in thickness from three-sixteenths to one one-half inches, past side trimming shears, which usually included separate opposed shears, were, of necessity, constructed very heavily which made them extremely expensive. In addition, in recent past shears a mechanism was provided to control the path of the movable knife so that during the cutting period of the shearing stroke an attempt was made to hold the knife perpendicular to the plate and immediately thereafter to displace it laterally away from the sheared edge. In this way a square sheared edge was sought and the movable knife was prevented from dragging against the sheared edge on its return stroke avoiding unnecessary knife wear or damage and, of equal importance, delay in advancing the plate to position it for the next cutting operation. Examples of more recent designs of such plate shears are illustrated in the following U.S. Pats:

No. 3,263,546 that issued to H. Musly et al. on Aug. 2, 1966;

No. 3,359,845 that issued to K. Greis et al. on Dec. 26, 1967;

No. 3,440,914 that issued to Ernst-August Klein on Apr. 29, 1969; and

No. 3,469,483 that issued to D. Hobson et al. on Sept. 30, 1969.

The mechanisms proposed in these and other shears for controlling the path of the movable knife have been found to have several serious disadvantages. First, many of the mechanisms for controlling the path did not allow for a true perpendicular cut for the normal range of plate thicknesses. Second, the mechanisms in general were extremely expensive and cumbersome to maintain. In addition, the knife control mechanisms were very slow and did not allow for quick and convenient adjustment of the knives. As to the requirement that the plates be sheared with a truly perpendicular edge, the normal range of thicknesses of the plates being substantial, as noted previously, falling between three-sixteenths and one one-half inches, past shears made it extremely difficult to either meet the requirement for the entire range or, if they did, they required very intricate and costly knife control mechanisms.

It is, therefore, the object of the present invention to provide a shear having an inexpensive, dependable and trouble-free control mechanism for the movable knife that will assure both a truly perpendicular cut over a wide range of thicknesses and quick and accurate displacement after cutting so that the knife is prevented from contacting the sheared edge during the return stroke thereof.

It is a further object of the present invention to provide a shear having a crank shaft for displacing a movable knife toward and away from a stationary knife, said movable knife being guided both in its shearing stroke and return stroke in a displaceable guide and means for mounting the guide to position the movable knife perpendicular to the material during shearing and for displacing the guide after shearing in a manner that the upper portion of the movable knife is moved in a forward direction while the lower portion is moved in a rearward direction with reference to the sheared edge of the material.

It is a still further object of the present invention to provide in a shear having a movable and stationary knife a crank shaft for displacing the movable knife, a cam rotated by said crank shaft in engagement with a cam roller, a link connecting said cam roller to a displaceable guide which guides the movable knife during its shearing and return stroke, means for urging the movable knife against said guide, and a stop means against which the guide is caused to engage and in which position the movable knife is held in a perpendicular relationship with regard to the material to be sheared, but is free to move away from the stop means during the return stroke of the shear to displace the knife away from the sheared edge.

Figure 2:
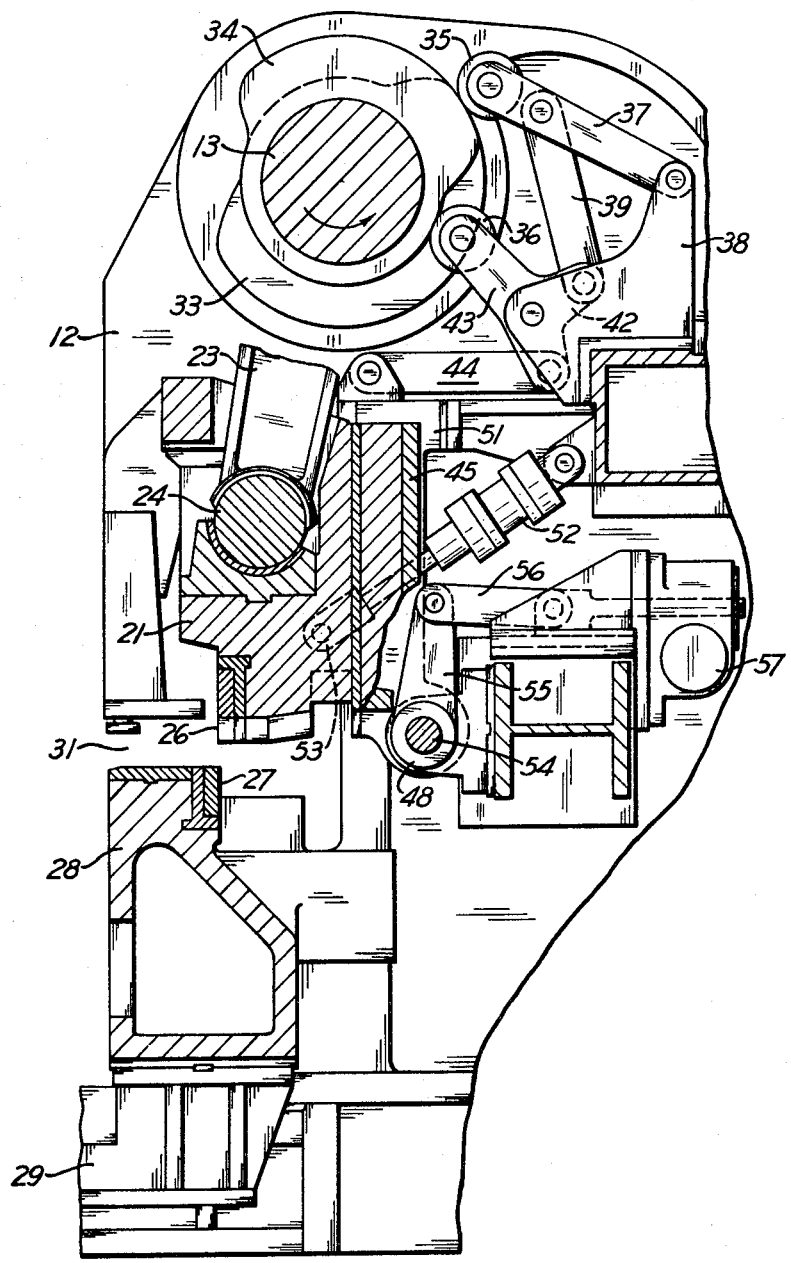
Figure 4:
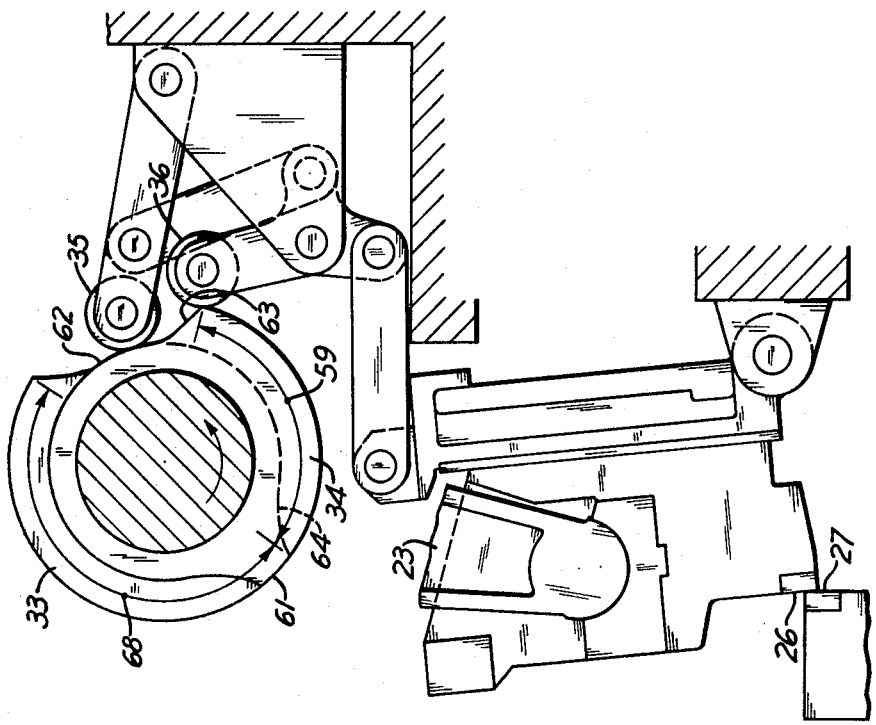
Figure 3:
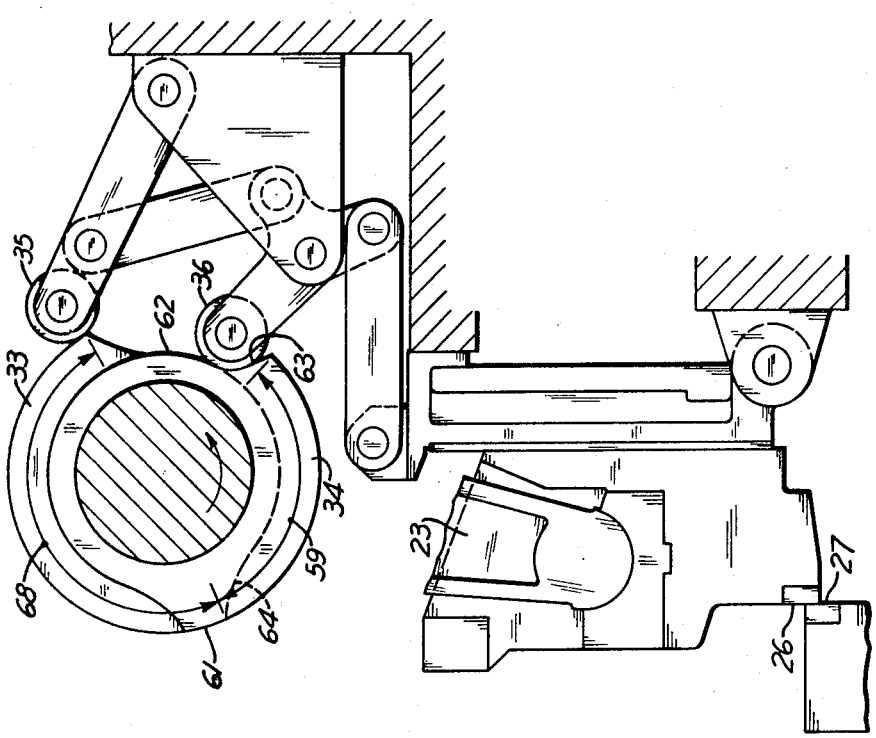

These objects as well as other novel features and advantages will be better appreciated when the following description is read along with the accompanying drawings, of which:

FIG. 1 is an elevational view, partly in section, of a side trimming plate shear incorporating the features of the present invention, FIG. 2 is a sectional view taken on lines 2—2 of FIG. 1 and illustrating the upper movable knife and associated parts in the position they assume at the beginning of the shearing stroke, and FIGS. 3 and 4 are elevational views showing the assumed position of the movable knife and associated parts of the shear illustrated in FIGS. 1 and 2 during the cutting portion of the shearing stroke and the first period of the return stroke immediately after cutting, respectively.

In referring first to FIG. 1, there is illustrated a plate side trimming shear made up of two identical upright housings 11 and 12, the upper portions of which rotatably support a crank shaft 13. The crank shaft is driven by an electrical drive, not shown, through a worm 14 and a worm wheel 15, the wheel being secured to a shaft 16 arranged in the same plane as the crank shaft 13. The shaft 16 is connected to the crank shaft 13 by a coupling 17. The gear elements 14 and 15 are supported from the housing 11 by a platform 18. Between the housings 11 and 12 there is arranged an upper knife head 21 which is connected to and vertically displaceable by the crank shaft 13 through downwardly extending pitmans 22 and 23. As best shown in FIG. 2, the pitmans are connected to the knife head 21 through bearings 24 which allow relative movement between the circular formed ends of the pitmans and the circular seats made up by the bearings 24 which are secured to the upper portion of the knife head 21.

To the lower portion of the knife head 21 is attached a knife 26 which has a vertical knife cutting surface which, on displacement, is brought into a cooperative cutting relationship with a similar surface of a knife 27, which is secured to a stationarily mounted lower knife head 28. The knife head 28, best shown in FIG. 2, actually extends between the two housings 11 and 12 and is carried by the bed plate 29 of the shear. In still referring to FIG. 2, it will be noted that the shear is provided with an opening 31 which receives the marginal edge of a plate fed in a longitudinal direction as one views the figure. Thus, the shear has an open side and a closed side, the closed side being at the back of the opening 31.

As previously noted, it is a feature of the present invention to so control the movement of the upper knife 26, and, more particularly, its supporting head 21, that during the shearing stroke, which is defined as the downward stroke of the head 21, and more particularly the cutting portion of the shearing stroke, the knife 26 is held in an accurate perpendicular relationship with respect to the top surface of the plate and, immediately after the completion of the cutting portion of the shearing stroke, the knife is displaced away from the sheared edge so that it may be quickly returned without interfering with or contacting the sheared edge. This objective, in the preferred embodiment of the present invention, is best illustrated in FIG. 2 where it will be seen that there is secured to the crank shaft 13 two distinct cams 33 and 34. These cams are rotatable with the crank shaft and have their surfaces formed and positioned in relation to the shearing and the return strokes of the shear. In engagement with the cams 33 and 34 are separate rollers 35 and 36, the roller 35 contacting the cam 33 and the roller 36 contacting the cam 34. As shown in FIG. 1, the cams are actually arranged midway between the pitmans 22 and 23 and, with reference to the particular position where FIG. 2 is taken, the cam 34 is behind the cam 33.

To the cam rollers 35 and 36 there is associated a control linkage system which comprises a link 37 connected at one end to the roller 35 and at the other end to a standard 38. By means of a second link 39, the link 37 is connected to the bell crank 42. The bell crank is formed with a third link 43, the outer end of which is connected to the cam 36. To the lower arm of the bell crank 42 there are connected two parallel, generally horizontally disposed links 44 which in turn are connected to a displaceable guide 45 provided for the upper shear head 21. The upper shear head 21 is adapted to be formed on its opposite sides with projections at the closed side thereof, which projections fit into L-shaped guideways formed in the displaceable guide 45. This guide construction is shown only in FIG. 1 where it is identified by the reference number 46. While, as noted, the guide 45 is connected to the links 44 at its top, at its bottom it is mounted on a pair of spaced-apart trunnion shafts 48 located in approximately the same plane through which the material to be sheared lies, and more particularly, it will be noted that their axes are generally in the same plane as the lowermost surface of the upper knife 26 when the knife is in its fully retracted position, as shown in FIG. 2. In this way the indirect shearing forces are directly transmitted to and resisted by trunnion shafts 48. Moreover, it can be seen from FIG. 2 that the construction of the guide 45 is such that it is allowed to tilt in a counterclockwise direction upon completion of the shearing stroke, as one views the guide in FIG. 2, which tilting will have the effect of tilting the knife away from the sheared edge of the plate.

The guide 45 is adapted to be held also in an accurate perpendicular position with respect to the top surface of the plate to be sheared, and for this purpose there is provided on the housings 11 and 12 a stop 51. The guide 45 is held against the stop and the head 21, in turn, is held against the guide by a piston cylinder assembly 52 which is connected to the head 21 through a clevis 53. It is important to note in referring to FIG. 52 that the axes of the trunnion shafts 48 are essentially in the same vertical plane as the stop 51, thereby assuring the desired accurate vertical relationship between the guide and the upper knife head 21 and the plate. The trunnion shafts are provided with eccentrics 54 which actually support the guide 45 and which cause a horizontal displacement thereof so that the horizontal spacing or distance between the cutting surfaces of the knives 26 and 27 can be adjusted with reference to the thickness of the plate to be cut. The eccentrics are rotated by an arm 55 which is secured to the eccentrics and to which there is connected a link 56, the link being reciprocated in a general horizontal direction by a power-operated mechanical jack 57.

In now briefly describing the knife action and control of the upper knife 26 through the aforesaid described mechanism, reference will be made to FIGS. 2, 3 and 4. FIG. 2 shows the various parts in the positions they will assume at the commencing of the downward stroke of the upper shear knife, which, as noted previously, is referred to as the shearing stroke. Before describing the various movements of the relevant parts, some characteristics of the cam should be described. The outside cam 33 is provided with a surface defined in FIG. 3 by the circular arrowed line 58 which represents that portion of the cam that will be in physical contact with the roller 35 and control the displacement of the linkage control system. Similarly, the arrowed line 59 related to the inside cam 34 defines that portion of the cam that will be in physical contact with the roller 36 and which will control the displacement and position of the linkage control system. Both cams have two portions that are generally of the same configuration shown in FIG. 3 as portions 61 and 62. It will be appreciated that at any one time only one cam roller will be in engagement aside from those portions of the cams which have identical cam surfaces.

As noted previously, FIG. 2 shows the position of the parts immediately preceding the commencement of the downward or shearing stroke and in which position the lever system is controlled by the cam 35 in engagement with the surface 58. It can be seen in comparing FIG. 2 with FIG. 3, FIG. 3 showing the completion of the shearing stroke, that this relationship prevails until the surface 63 of the cam 34 comes into contact with the cam roller 36 to effect a displacement of the linkage system to cause it to assume a position illustrated in FIG. 4. During the period that the shear head 21 is being controlled by the cam 35 in engagement with the surface 58, there will be no tilting of the upper knife head and the action will be controlled by the vertical position of the displaceable guide 45 so that the knife 26 is held in an accurate perpendicular relationship to the plate to be sheared. Once the shearing stroke is completed, which is the position illustrated in FIG. 3, the portion 63 of the cam 34 will strike the cam roller 36 to cause the roller 35 to move away from the cam 33, and the bell crank to move in a clockwise direction as one views FIGS. 3 and 4 so that the links 44 are forced in a direction to the left causing a displacement of the displaceable guide 45 to the position illustrated in FIG. 4. In this position it will be noted that while the upper portion of the knife head 21 has been caused to be displaced toward the open side of the shear, the knife itself is tilted away from the cutting edge where it will remain during the initial period of the return stroke.

This period, of course, will be defined by the cam surface of the cam 34 in contact with the roller 36 during the period that the crank shaft 13 is rotated from the FIG. 4 position back to the FIG. 2 position. As the return stroke passes through this phase, the surface 64 formed on the cam 33 is brought into a position to engage the roller 35 thereby forcing the linkage system from the position shown in FIG. 4 to the position shown in FIG. 2 where the shear will assume a position in readiness for the next shearing operation. During the entire shearing operation, the piston cylinder assembly 52 will be operated to assure that the guide 45 contacts the stops 51 as the shear approaches the shearing cycle and also throughout the entire shearing cycle that the head 21 is held against the guide 45.

While in the preferred form of the present invention there are employed separate cams, the desired movement of the upper knife 26 can be achieved by a single cam and by different forms of control linkage mechanisms and even directly by a piston cylinder assembly.

In accordance with the provisions of the patent statutes, I have explained the principle and operation of my invention and have illustrated and described what I consider to represent the best embodiment thereof.

I claim:

1. In a shear for severing material comprising:
   a frame,
   a crank shaft rotatably supported in said frame,
   a movable knife head received in said frame adapted to support a first knife,
   a second knife arranged to cooperate with said first knife to effect a shearing of the material,
   a pitman connected to and extending between said crank shaft and said movable knife head adapted to displace said first knife through a shearing stroke and a return stroke,
   a displaceable guide engaging a side of said movable knife head extending in a direction generally parallel to the shearing stroke, and
   means for displacing said guide in a direction towards said movable knife head in a manner that the portion of the movable knife head farthest away from the first knife is tilted toward the second knife and the portion of the movable knife head closest to the first knife is tilted away from said second knife.

2. In a shear according to claim 1 including a means for maintaining said guide in a position perpendicular to the material to be sheared during at least the cutting portion of the shearing stroke of the shear.

3. In a shear according to claim 2 wherein said means for displacing said guide comprises a cam means arranged on said crank shaft for rotation therewith,
   a control lever means arranged to engage said cam means,
   means for connecting said control lever means to said guide,
   said cam means being formed in relationship to said shearing and return strokes of said first knife so that the guide is mounted in its perpendicular position during the shearing stroke and in its tilted position during at least the first part of its return stroke.

4. In a shear according to claim 3 wherein said cam means includes two distinct cams and said control lever means includes two cam rollers, each engaging a different one of said cams,
   one of said cams formed to produce said shearing stroke and the other being formed to produce said return stroke, and
   means for causing only one of said cam rollers to engage said cam surfaces at any one time.

5. In a shear according to claim 2 including a trunnion shaft having its axis arranged approximately co-planar with the surface of the movable knife most adjacent to the material when at the top of the shearing stack,
   means for connecting one end of said guide to said trunnion shaft in a manner that the guide is allowed to be displaced from its said perpendicular position to its said tilted position.

6. In a shear according to claim 2 including means connected to said movable knife head for urging said knife head against said guide.

7. In a shear according to claim 2 including stop means carried by said frame arranged to be engaged by said guide during the shearing stroke.

8. In a shear according to claim 5 including an eccentric carried by said trunnion shaft and on which said guide is mounted,
   means for rotating said eccentric to displace said guide and said first knife relative to said second knife in a direction generally normal to the direction of the shearing stroke.

9. In a shear for severing material such as metallic rolled plates and the like, comprising:
   a pair of upright frames constructed to have an open side and a closed side,
   a crank shaft extending between and rotatably carried by said frames,
   a movable knife head arranged between said frames,
   an upper knife carried by said movable knife head,
   a stationary knife head arranged between said frames,
   a lower knife carried by said stationary knife head adapted to cooperate with said upper knife to shear said material,
   a pair of pitmans connected to and extending between said movable knife head and said crank shaft adapted to displace said movable knife head in a general vertical direction towards and away from said lower knife,
   a vertically extending displaceable guide arranged at the closed side of said shear,
   cooperative surfaces formed on the outward vertical side of said guide and the adjacent inward vertical side of said movable head,
   a trunnion shaft arranged at said closed side of the shear and approximately co-planar with the plane through which the material is fed to said sheer and inward of said cooperative surfaces of said guide and movable knife head,
   a pair of cams rotated by said crank shaft, one cam formed with a surface adapted to control the shearing stroke and the other cam formed with a surface adapted to control the return stroke of said movable knife head, separate cam rollers arranged to engage a different one of said cams, control linkage connecting said cam rollers to separate levers, means for connecting said levers to the upper portion of said guide, means for urging said cooperative surfaces of said guide and movable head into engagement with each other, and a stop means carried by said frames against which said guide is urged by said urging means.

* * * * *